United States Patent [19]

Loontjens

[11] Patent Number: 4,499,242

[45] Date of Patent: Feb. 12, 1985

[54] THERMOPLASTIC PROPYLENE BLOCK COPOLYMER CONTAINING 1-ALKENE-PROPYLENE-DIENE COPOLYMER BLOCK

[75] Inventor: Jacobus A. Loontjens, Meerssen, Netherlands

[73] Assignee: Stamicarbon B.V., Geleen, Netherlands

[21] Appl. No.: 456,433

[22] Filed: Jan. 7, 1983

[30] Foreign Application Priority Data

Jan. 8, 1982 [NL] Netherlands .................. 8200049

[51] Int. Cl.$^3$ ............... C08F 293/00; C08F 297/08
[52] U.S. Cl. ............................ 525/289; 525/290; 525/314; 525/323
[58] Field of Search ............ 525/289, 290, 314, 323

[56] References Cited

U.S. PATENT DOCUMENTS 3,957,910  5/1976  van den Berg .................. 525/290

FOREIGN PATENT DOCUMENTS 1019167  2/1966  United Kingdom .............. 525/323

Primary Examiner—Wilbert J. Briggs, Sr.
Attorney, Agent, or Firm—Cushman, Darby & Cushman

[57] ABSTRACT

The invention relates to a thermoplastic propylene block copolymer comprising one or more substantially crystalline polypropylene blocks and one or more 1-alkene-propylene copolymer blocks, in at least one of which 1-alkene-propylene copolymer blocks diene units are present, and to a process for preparing such a propylene block copolymer.

According to the invention, as diene, a cyclic hydrocarbon compound is used wherein at least one double bond forms part of a strained structure, particularly a polycyclic compound with 7 to 20 carbon atoms containing at least one 4- and/or 5-ring, with one or more double bonds in or to the ring.

The invention offers the advantage that it is possible to prepare block copolymers which can otherwise not or hardly be made, while at the same time only a small quantity is formed of byproducts which are soluble in the dispersant.

11 Claims, No Drawings

THERMOPLASTIC PROPYLENE BLOCK COPOLYMER CONTAINING 1-ALKENE-PROPYLENE-DIENE COPOLYMER BLOCK

The invention relates to a thermoplastic propylene block copolymer comprising one or more substantially crystalline polypropylene blocks, and one or more 1-alkene-propylene copolymer blocks, in at least one of which 1-alkene-propylene copolymer blocks diene units are present.

From the Derwent abstract 35725 Q (Japanese patent publication No. 20751/69) a thermoplastic propylene block copolymer is known consisting of a polypropylene block, a poly-ethylene-propylene-octadiene-1,7-block and a polyethylene block. A similar block copolymer with cyclooctadiene-1,5 as the diene could possibly be formed in the process according to Chemical Abstracts 71 (24), 113670 c (Japanse patent publication No. 19542/69).

In the preparation of such block copolymers the problem arises that during the step in which the poly-ethylene-propylene-octadiene block is made, a large quantity of byproduct is obtained that is soluble in the dispersant. This has a number of disadvantages. In the first place it means a loss of raw materials, because the fraction dissolved in the dispersant does not form a usable product.

This already immediately indicates the second problem, formed by the fact that the fraction dissolved in the dispersant must eventually be carried off.

A third disadvantage concerns the fact that the fraction which dissolves in the dispersant strongly increases the viscosity thereof. The viscosity of the dispersant may even become so high as to make sufficient mixing impossible. This means a considerable reduction of the capacity of the installation, because on account of this it is possible only to operate at relatively low slurry concentrations.

Moreover, there is a need of products combining reasonable to good flowability with a high impact resistance. Such a combination of properties cannot be obtained in the propylene block copolymer according to the Japanese patent publications.

The object of the invention is to provide a thermoplastic block copolymer in which these problems do not occur.

The block copolymer according to the invention is characterized in that, as diene, a cyclic hydrocarbon compound is used wherein at least one double bond forms part of a strained structure. A strained structure means in this connection that the valence angles of at least one of the two carbon atoms of the said double bond differ from the $sp^2$ hybridization state.

The invention also relates to a process for the preparation of a thermoplastic propylene block copolymer, in which process propylene is polymerized in one or more first steps under conditions in which substantially crystalline polypropylene is formed, in one or more subsequent steps a mixture of a 1-alkene and propylene is polymerized, in at least one of which 1-alkene-propylene polymerization steps a diene is present, and finally propylene or ethylene is possibly polymerized in one or more final steps.

This process is characterized in that, as diene, a cyclic hydrocarbon compound is used wherein at least one double bond in the ring forms part of a strained structure.

In this connection the term '1-alkene' means a 1-alkene other than propylene, for instance a 1-alkene having 2 or 4–12 carbon atoms. Preference is given to ethylene.

As cyclic diene various dienes can be used. Strained structures are particularly present in polycyclic compounds. Generally, these compounds have 7 to 20 carbon atoms.

Preference is given to using as diene a compound containing one or more 4- and/or 5-rings, with one or more double bonds in or to the ring. Preferably the double bonds are not conjugated. Very useful dienes are those that possess the bicyclo[2.2.1.]heptene skeleton. Preference is given in particular to dienes having both double bonds in the 4- and/or 5-rings.

It has been found that with these compounds, the quantity required to obtain the desired effect is very small indeed.

Suitable dienes for application in the present invention are norbornadiene, dicyclopentadiene, tricyclopentadiene, 5-ethylidenenorbornene-2, 5-methylenenorbornene-2, 5-vinylnorbornene-2, 5-(2-propenyl)norbornene-2, isopropylidenetetrahydroindene and 4, 7, 8, 9-tetrahydroindene.

Very suitable compounds are ethylidenenorbornene, dicyclopentadiene and norbornadiene. In particular with norbornadiene the desired effect is reached already with very small quantities.

Surprisingly it has been found that, according to the invention, a thermoplastic block copolymer can be obtained having a combination of properties which has so far not been possible before, namely the combination of reasonable to good flowability and a very high impact resistance, also at low temperatures. According to the invention block copolymers can be made combining an impact resistance of 40–60 (Izod, notched, according to ASTM D 256, 296 K) with a melt index of 1–4 (dg/min, ISO R 1133, 503 K/21.6 N).

Moreover, these block copolymers have the advantage that in the preparation substantially fewer byproducts are formed that are soluble in a dispersant.

Hence, with the present invention it is possible to make block copolymers which can otherwise not or hardly be made, while at the same time no problems arise in consequence of the formation of byproducts, such as capacity reduction resulting from the high viscosity, purification of the dispersant and processing of the byproduct.

According to a preferred mode of realizing the invention the block copolymer is built up of a first polypropylene block, one or more polyethylene-propylene-diene blocks and possibly a polyethylene block.

In this connection it is noted that the term polypropylene means those propylene polymers most of which ($\geq 90$ % wt, preferably $\geq 95$ % wt, more specifically 100 % wt) is built up of propylene units. It is possible to use ethylene or higher 1-alkenes as comonomers. The quantities thereof are so small, however, that the propylene polymers are still always substantially crystalline ('disordered' polypropylene).

The block copolymer is preferably built up with 10–90 % wt polypropylene blocks, 10–90 % wt polyethylene-propylene-diene blocks and 0–50 % wt polyethylene blocks.

The content of diene units in the poly-ethylene-propylene-diene blocks is preferably between 0.1 and 25 % wt, but particularly between 0.1 and 5 % wt. Within these limits a block copolymer is obtained having optimum processing characteristics and a very good impact resistance.

The overall composition of the block copolymer may vary within very wide limits. The block copolymer, however, must retain thermoplastic properties. The composition may e.g. be 50–95 % wt propylene, 5–49.99 % wt ethylene, 0.01–10 % wt diene and 0–15 % wt other monomers.

In the polyethylene-propylene-diene block preference is given to taking the ethylene-propylene molar ratio between 0.1 and 10, more specifically between 0.5 and 3, because with such ratios the highest impact resistances are obtained. Such ethylene-propylene molar ratios can be incorporated in the block copolymer by taking the ethylene-propylene molar ratio in the feed between 0.5 and 5, more specifically between 0.5 and 3.0. In practice the ratio in the feed will be regulated on the basis of the composition of the gas mixture over the liquid in the reactor.

For the preparation of the present block copolymers the known high-stereospecific catalyst systems can be used, for instance those based on a $TiCl_3$-containing component prepared by reduction of $TiCl_4$ with aluminium or an organic aluminium compound, such as aluminiumdiethyl-chloride or aluminimethylsesquichloride and, if required, subjected to a thermal after-treatment. A $TiCl_3$ component subjected to an after-treatment with complex-forming compounds can be used also. It is possible also to use a catalyst system based on a titanium compound on a carrier, such as $MgCl_2$, $SiO_2$ or $Al_2O_3$, an organic aluminium compound, as well as an electron donor compound, for instance an organic ester or amine.

If desired the stereospecificity of the catalyst system can be increased by an addition of so-called third components (complex-forming compounds) to the polymerization mixture. Suitable complexforming compounds are, for instance, ethers, thioethers, thiols, phosphines, amines, amides, ketones, esters, more in particular ethers having the formula R—O—R, where R is an alkyl group having 1–15 carbon atoms. Suitable third components for increasing the stereospecificity are further, for instance, cyclopolyenes and phosphoric acid amides, in particular cycloheptatriene and hexamethylphosphoric acid triamides.

The catalyst system may contain an activator. Preference is given to using, as activator, organometallic compounds having the formula $MeR_qX_{p-q}$, where Me is a metal from the first, second or third main group or the second subgroup of the Periodic System, preferably aluminium or zinc, in particular aluminium, R is a hydrocarbon residue having 1–16 carbon atoms, preferably an alkyl group having 1–16 carbon atoms, in particular an alkyl group having 2–12 carbon atoms, X is hydrogen, a halogen atom or an alkoxy or dialkylamine group having 1–8 carbon atoms, p is the valence of Me and q is an integer corresponding with $1 \leq q \leq p$.

Particularly suitable are chlorine-containing organo-aluminium compounds, such as dialkylaluminiummonochlorides having the formula $AlR_2Cl$ or alkylaluminiumsesquichloride having the formula $Al_2R_3Cl_3$, where R has the meaning given above. Examples are: $Al(C_2H_5)_2Cl$, $Al(i-C_4H_9)_2Cl$, $Al_2(C_2H_5)_3Cl_3$.

Aluminiumtrialkyls $AlR_3$ or aluminiumdialkylhydrides having the formula $AlR_2H$ can also be used, where R has the meaning given above. In that case preference is given to taking $Al(C_2H_5)_3$, $Al(C_2H_5)_2H$, $Al(C_3H_7)_3$, $Al(C_3H_7)_2H$, $Al(i-C_4H_9)_3$ or $Al(iC_4H_9)_2H$.

The circumstances under which the polymerization reaction with the catalytic titanium component according to the invention is performed do not differ from those known in the art. The reaction is performed preferably in the presence of a dispersant. The dispersant may be inert or also a monomer in liquid form. Examples of suitable dispersants are aliphatic, cycloaliphatic, aromatic and mixed aromatic/aliphatic hydrocarbons having 3–8 carbon atoms per molecule, such as propylene, butylene-1, butane, isobutane, n-hexane, n-heptane, cyclohexane, benzene, toluene and the xylenes. More specifically propylene, n-hexane or n-heptane are used. titanium compound should preferably be about 0.001–0.5 mmole, calculated as titanium atom, and the concentration of the organometallic compound about 0.1–50 mmoles, both per liter dispersant.

The polymerization temperature is mostly between 190 and 475 K., preferably between 310 and 375 K. The pressure may, for instance, be between 1 and 30 bar.

If so desired, the molecular weight of the polymer can be regulated during the polymerization, for instance by operating in the presence of hydrogen or another known molecular weight regulator.

The polymerization reaction can be effected both batchwise and continuously.

The invention is elucidated by means of the following nonrestrictive examples and the comparative examples.

EXAMPLE I

To a 5-l autoclave, provided with a mechanical stirrer, 2.5 l heptane is added, followed by 2 g diethylaluminiumchloride (20 % wt solution in heptane) and 1.0 g $TiCl_3.\frac{1}{3} AlCl_3$. With propylene the pressure is brought to 8 bar and the temperature to 343 K.

The polymerization is effected in the presence of hydrogen having a concentration of 2 % vol in the gas phase over the liquid. After 3 hours the pressure is relieved to 1 bar. After addition of 10 ml EN (5-ethylidenenorbornene-2) to the autoclave, a mixture of ethylene, propylene and hydrogen is passed in continuously in an ethylene-propylene molar ratio of 3. After that, polymerization is effected for 2.5 hours at a pressure of 2 bar. After the pressure has been relieved, the slurry obtained is removed from the reactor, treated with n-butanol and extracted with water. The slurry is subsequently centrifuged off.

The dissolved polymer content is 4.8 % wt. The powder is dried, stabilized and granulated. The mechanical properties are: melt index (ISO R 1133, 21.6 N, 503 K) = 3.1 dg/min, Izod (ASTM D 256, 296 K) = 42.5 kJ/m$^2$ and E-modulus (ASTM D790) = 1110 N/mm$^2$.

COMPARATIVE EXAMPLE I

The polymerization is effected in the same way as described in example I, except that no EN is added this time. The dissolved polymer content now amounts to 7.2 % wt. The mechanical properties are: melt index = 3.1 dg/min; Izod = 13.0 kJ/m$^2$; E-modulus = 1325 N/mm$^2$.

EXAMPLE II

The polymerization is effected analogously to example I. Now 10 ml DCPD (dicyclopentadiene) is added instead of EN and an ethylene-propylene molar ratio of 5 is applied.

The dissolved polymer content is now 4.6 % wt. The viscosity of the polymerization medium after the polymer has been centrifuged off is 4.9 cSt.

COMPARATIVE EXAMPLE II

The polymerization is effected analogously to example II, except that no DCPD is used this time. The dissolved polymer content is 8.0 % wt and the viscosity of the polymerization medium centrifuged off is 35.9 cSt.

EXAMPLE III

The polymerization is effected analogously to example I, except that 10 ml DCPD is added this time instead of EN and that the ethylene-propylene molar ratio is 5. The dissolved polymer content is 4.0 % wt and the viscosity of the polymerization medium centrifuged off as function of temperature and shear rate is:

| shear rate $(s^{-1})$ | $\eta$ (mPa·s) 293 K | $\eta$ (mPa·s) 343 K |
| --- | --- | --- |
| 5194 | — | 2.6 |
| 2597 | 4.8 | 2.9 |
| 1298 | 5.5 | 3.3 |
| 649 | 6.7 | 4.2 |
| 325 | 7.5 | 5.2 |
| 162 | 8.0 | 6.0 |
| 81 | 9.0 | — |

COMPARATIVE EXAMPLE III

The polymerization is effected analogously to example III, except that no DCPD was added this time. The dissolved polymer content is 6.2 % wt. The viscosity of the polymerization medium, after centrifuging off, as function of the temperature and shear rate is:

| shear rate $(s^{-1})$ | $\eta$ (mPa·s) 293 K | $\eta$ (mPa·s) 343 K |
| --- | --- | --- |
| 1298 | — | 9.8 |
| 698 | 21.2 | 11.6 |
| 325 | 25.9 | 13.2 |
| 162 | 31.4 | 15.5 |
| 81 | 37.9 | 18.9 |
| 41 | 45.9 | 25.9 |

EXAMPLE IV

The polymerization is effected analogously to example I, except that an ethylene-propylene molar ratio of 2.25 is taken this time and 1 ml norbornadiene is added instead of EN. The dissolved polymer content is 5.0 % wt and the polymerization medium is low-viscous.

COMPARATIVE EXAMPLE IV

The polymerization is effected analogously to example IV, except that no norbornadiene was added this time. The dissolved polymer content is now 9.0 % wt and the polymerization medium is viscously thick.

EXAMPLE V

The polymerization is effected analogously to example IV, except that this time 5 ml 5-vinylnorbornene-2 is added instead of norbornadiene. The dissolved polymer content is 5.4 % wt and the polymerization medium is low-viscous.

I claim:

1. Thermoplastic propylene block copolymer comprising at least one substantially crystalline polypropylene block, at least one 1-alkene-propylene copolymer block, in at least one of which 1-alkene-propylene-blocks diene units are present which possess the bicyclo[2.2.1.]heptene skeleton.

2. Block copolymer according to claim 1, wherein the block copolymer is built up of a first polypropylene block and at least one poly-ethylene-propylene-diene block.

3. Block copolymer according to claim 1, wherein the block copolymer is built up of 10–90 % wt polypropylene block, 10–90 % wt poly-ethylene-propylene-diene copolymer block and 0–50 % wt polyethylene block.

4. Block copolymer according to claim 1, wherein the diene content in the poly-ethylene-propylene-diene blocks is between 0.1 and 5 % wt.

5. Block copolymer according to claim 1, wherein, as diene, a polycyclic compound with 1–20 carbon atoms is used containing at least a 4- and/or a 5-ring, with at least one double bond in or to the ring.

6. Block copolymer according to claim 1, wherein said diene units are chosen from the group consisting of: norbornadiene, dicyclopentadiene, tricyclopentadiene, 5-ethylidenenorbornene-2, 5-methylenenorbornene-2, 5-vinylnorbornene-2 and 5-(2-propenyl)norbornene-2.

7. Process for the preparation of a thermoplastic propylene block copolymer according to claim 1, wherein propylene is polymerized in at least one first step under conditions in which substantially crystalline polypropylene is formed, wherein in at least one subsequent step a mixture of a 1-alkene and propylene is polymerized, and wherein in at least one of said subsequent 1-alkene-propylene polymerization steps a diene is present, this process being characterized in that, as diene, a cyclic hydrocarbon compound is used wherein at least one double bond forms part of a strained structure.

8. Process according to claim 7, wherein in said first step a polypropylene block and in said at least one subsequent step polyethylene-propylene-diene blocks are prepared.

9. Block polymer according to claim 2, further including a polyethylene block.

10. Process according to claim 7, wherein, in at least one final step, propylene, or ethylene is polymerized.

11. Process according to claim 8, wherein, in at least one final step, a polyethylene block is prepared.

* * * * *